3,666,505
HIGH DIELECTRIC CONSTANT CERAMIC BODIES AND COMPOSITIONS FOR PRODUCING SAME COMPRISING IRON OXIDE

Lewis C. Hoffman and Takashi Nakayama, Wilmington, Del., assignors to E. I. du Pont de Nemours and Company, Wilmington, Del.
No Drawing. Continuation-in-part of application Ser. No. 733,288, May 3, 1968. This application Nov. 20, 1970, Ser. No. 91,538
Int. Cl. C04b *33/06;* H01b *1/06*
U.S. Cl. 106—39 R        14 Claims

ABSTRACT OF THE DISCLOSURE

Dielectric compositions comprising powder mixtures of (A) a calcined inorganic material consisting essentially of $BaTiO_3$ and an oxide selected from the group consisting of $ZrO_2$, $Al_2O_3$, $SiO_2$, $Nb_2O_5$ and mixtures thereof, (B) $Fe_2O_3$ and (C) a glass binder. The dielectric compositions are useful in preparing electrical capacitors, the dielectric layers of which can be formed from a dispersion of the composition in an inert liquid vehicle and applied by screen stencilling methods. Firing of such layers coated with a suitable electrode material yields capacitors having high dielectric constants and low dissipation factors.

CROSS REFERENCE TO RELATED APPLICATION

This application is a continuation-in-part of our copending application S.N. 733,288, filed May 31, 1968 now abandoned.

BACKGROUND OF THE INVENTION

This invention relates to electronic circuitry and, more particularly, to dielectric compositions for use therein.

Materials such as crystalline barium titanate and various niobates have been substituted for sheets of mica or glass as the dielectric layer or body in making layered or laminated electrical capacitors, because of their higher dielectric constants. Such bodies have generally been formed by molding the finely divided crystalline material into the desired shape, followed by firing to sinter the particles together. The high firing temperatures required have precluded the use of some of the more practically available noble metals as electrode materials, particularly in methods where it is desired to effect sintering of the dielectric layer and the firing thereon of an electrode in a single firing operation. The sintering temperature of the dielectric layer can be lowered somewhat by the inclusion as a bonding agent of a small amount of a siliceous or argillaceous material. However, the sintering temperature generally is still too high and acceptable dissipation factor values can generally be achieved only by a drastic lowering of the dielectric constant.

It has been proposed to prepare dielectric layers having high dielectric constants and lower dissipation factors by melting all the constituents of the dielectric layer, then quickly cooling the melt in specific ways to cause crystallization to occur. U.S. Patent 3,195,030 to Herczog et al. proposes quick cooling the melt to form a glass body which is heat treated to effect crystallization, then cooled. Such methods, which require melting of all constituents, obviously would not permit simultaneously firing electrodes on the dielectric layer.

The present invention relates to powder dielectric compositions which are useful in the manufacture of dielectric ceramic bodies such as capacitor layers or coatings having high dielectric constants and acceptable dissipation factor values, which compositions can be formed into coherent ceramic bodies or layers while simultaneously firing thereon noble metal electrode coatings. In this area of technology, very high dielectric constants and good dissipation factor values are desired. Also, the ceramic bodies are not subject to changes of capacitance due to changes in temperature. Furthermore, since the temperatures required for forming such bodies are approximately the same temperatures now widely used in firing various electronic components formed by screen stencilling methods, the firing operations for making capacitors from the present dielectric compositions can be fitted well into the firing and schedules now in wide commercial use.

SUMMARY OF THE INVENTION

A dielectric composition comprising a powder mixture of (A) a calcined inorganic material consisting essentially of 95–99.99 mole percent $BaTiO_3$ and 0.01–5 mole percent of an oxide selected from the group consisting of $ZrO_2$, $Al_2O_3$, $SiO_2$, $Nb_2O_5$ and mixtures thereof, (B) $Fe_2O_3$ and (C) a nonconductive glass binder, wherein said powder mixture, in weight, consists essentially of 90–98.5% of (A), 0.5–5% (B) and 1–5% (C).

A dispersion of the dielectric composition in an inert liquid vehicle is produced. Additionally, ceramic bodies comprising the product resulting from the firing of the dielectric compositions are produced.

DETAILED DESCRIPTION

The inorganic material utilized as component (A) of this invention is a calcined mixture of $BaTiO_3$ and an oxide selected from the group consisting $ZrO_2$, $Al_2O_3$, $SiO_2$, $Nb_2O_5$ and mixtures thereof. While physical mixtures of $BaTiO_3$ and one or more of the other enumerated oxides may be utilized it has been discovered that the calcination of $BaTiO_3$ with one or more of the oxides produces dielectric ceramic bodies which have very high dielectric constants and low dissipation factors. The exact theory is not known but the requirement for calcination is an essential feature in obtaining very high dielectric constants according to this invention (e.g., over K of 1,000). The calcined inorganic material contains 95–99.99 mole percent BaTiO and 0.01–5 mole percent of an oxide selected from a group consisting of $ZrO_2$, $Al_2O_3$, $SiO_2$, $Nb_2O_5$ and mixtures thereof. The amount of the oxide is determined by the solubility of the oxide in $BaTiO_3$. In addition, it is theorize that the $ZrO_2$ makes the $BaTiO_3$ more reactive toward $Fe_2O_3$ and the glass binder.

Component (B), which is $Fe_2O_3$, can be present within the range 0.5–5%, usually 1–5%, based on total weight of dielectric composition. The purpose of the $Fe_2O_3$ is mainly to raise the dielectric constant. Therefore, at least 0.5% must be present in the dielectric composition to produce the desirable dielectric constants. On the other hand, if more than 5% $Fe_2O_3$ is present, the dissipation factors become too high and the reproducibility properties of the dielectric composition are too irregular. Consequently, the $Fe_2O_3$ is a critical and essential component in the dielectric composition of this invention.

Component (C) is a substantially nonconductive glass binder, said binder being present within the range of 1–5% by weight of the dielectric composition. Specific types of glass which can be used are the bismuth borate, the bismuth silicate, the bismuth borosilicate, the lead bismuth borosilicate and the lead bismuth borate glasses.

Of the glass types indicated above, the lead bismuth borosilicate glasses in which the combined amounts of $SiO_2$ plus $B_2O_3$ is about 6–10% are preferred. The most preferred glasses contain 70–90% $Bi_2O_3$, 5–15% PbO, 2–5% $SiO_2$ and 2–5% $B_2O_3$. Other glasses that have been used successfully include: a lead borate glass (90% PbO, 10% $B_2O_3$), a lead borosilicate glass (70% PbO, 18% $SiO_2$, 12% $B_2O_3$), a cadmium borosilicate glass (90%

CdO, 5% $SiO_2$, 5% $B_2O_3$) and a lead tungsten borosilicate glass (50% PbO, 40% $WO_3$, 5% $SiO_2$ and 5% $B_2O_3$).

The amount of glass binder present in the dielectric compositions of this invention should not exceed that amount which forms a dielectric having a high dielectric constant. Fired bodies and coatings having too much glass binder (e.g., more than 5%) exhibit lower dielectric constants than do similar bodies containing no absorbed or excess glass binder. Glass provides fluxing and bonding capabilities to bind the dielectric particles together and eliminate porosity even though the dielectric compositions of this invention are fired below the sintering temperature of $BaTiO_3$.

The composition components are best employed in fine powder form conveniently obtained by crushing and grinding. Their small particle size enables the components to be mixed in intimate contact so that on firing the active glass constituents of the glass binder and $Fe_2O_3$ can be readily absorbed by and reacted with the calcined inorganic material particles. In those instances in which the compositions are to be screen stencilled, the particles should be of a size that will pass through the screen with which they are used. Screens of 100 mesh, 200 mesh and 325 mesh (U.S. Standard Sieve Size) have been used with the finely divided compositions of this invention. A preferred particle size is 0.5–5 microns, particularly with respect to the calcined inorganic material and the $Fe_2O_3$. It will be appreciated that the particle size of the starting components can be varied, together with the duration and temperature of firing, to control the formation of modified, crystalline material of high dielectric constant.

The powdered compositions having the particle sizes indicated above can be converted to coherent dielectric bodies and coatings by firing, and thus have particular utility in the screen stencilling of capacitor dielectrics onto ceramic substrates, and in the manufacture of "green" (i.e., unfired) ceramic sheets.

Screen printed capacitors which comprise dielectric layers formed from a dielectric composition of this invention can conveniently be prepared by screen stencilling a first conductive layer, hereinafter referred to as an electrode, onto a ceramic substrate and thereafter screen stencilling the dielectric composition of this invention thereover, followed by a screen stencilling of a second conductive layer, hereinafter referred to as a counterelectrode, over the first two layers.

Each of the two electrodes and the intermediate dielectric layer of the capacitor formed may be fired separately or the three may be fired at one time; or the dielectric layer may be fired with either of the two electrodes. Capacitors having more than one electrode and one counterelectrode can be screen stencilled onto the ceramic substrate as desired. The deposited layers may be fired in any number of firings desired. The dielectric layer should be fired at a temperature in the range 750–1150° C. for a time in the range 10 minutes to four hours, preferably at 850–1100° C. for 10 minutes to an hour. Connection of the electrodes and counterelectrodes may be achieved by extending the dimensions of the electrodes and the counterelectrodes beyond the dimensions of the dielectric layers. For the purpose of demonstrating this invention, the examples set forth hereinafter have been limited to capacitors consisting of only one electrode and one counterelectrode.

A wide variety of conductive metalizing compositions can be used to form the counterelectrode. However, it has been found that in those instances where the counterelectrode layer and dielectric layer are fired together, superior electrical properties are imparted to the capacitor if the glass binder of the metallizing composition for the counterelectrode consists essentially of one of the glass components referred to above as usable in the dielectric composition.

To further illustrate this invention the following examples are set forth in detail. All percentages are expressed in weight percent, except in describing the calcined inorganic material components of Table I, which are expressed in mole percent. All dielectric constants (K) and dissipation factors (DF) reported were determined in accordance with ASTM methods 150–59T.

EXAMPLES

Calcined inorganic materials Nos. 1 through 7, for use in Examples 1 through 7, respectively, were prepared by admixing various amounts of $BaTiO_3$ and oxide as set forth in Table I. These mixtures were calcined by heating to a temperature within the range of 1100–1200° C. for two hours; then the mixtures were steel ball milled for 64 hours.

TABLE I

| Component | Calcined inorganic material number (mole percent) | | | | | | |
|---|---|---|---|---|---|---|---|
|  | 1 | 2 | 3 | 4 | 5 | 6 | 7 |
| $BaTiO_3$ | 98.2 | 96.4 | 99 | 97.7 | 99.1 | 96.2 | 98.2 |
| $ZrO_2$ | 1.8 | 3.6 | 1 |  |  |  | 1.8 |
| $Al_2O_3$ |  |  |  | 2.3 |  |  |  |
| $Nb_2O_5$ |  |  |  |  | 0.9 |  |  |
| $SiO_2$ |  |  |  |  |  | 3.8 |  |

Example 1

Onto an alumina substrate was screen stencilled a metalizing composition, whose inorganic solids content consisted of 18.5% platinum, 67.7% gold, 11% $Bi_2O_3$ and 2.8% glass. The glass in the metalizing composition consisted of 12.7% $SiO_2$, 7.3% $Na_2O$, 63.1% CdO and 16.9% $B_2O_3$. The vehicle employed was an 8% solution of ethyl cellulose in beta-terpineol and constituted 20% of the total weight of the metalizing composition. All of the inorganic solids of the metalizing composition were sufficiently small to pass through the 325-mesh screen which was used to screen stencil. The stencilled metalizing layer was dried and fired at 1050° C. for two minutes to form an electrode.

Thereafter, a dielectric composition, having a solids content as prescribed for Example 1 in Table II, was stencilled through a 325-mesh screen over the electrode. The vehicle employed was an 8% solution of ethyl cellulose in beta-terpineol and constituted 20% of the total weight of the dielectric composition. The resulting dielectric layer was dried at 100° C. for two minutes; another dielectric layer was printed over the first layer and similarly dried.

A second electrode from the above-described metalizing composition was printed over the dried dielectric layers. The entire stack (i.e., substrate, bottom metalization, dielectric and top metalization layers) was then fired at 1050° C. for 15 minutes. The resulting capacitor exhibited a very high dielectric constant and low dissipation factor when measured at one kilohertz, as recorded in Table II. The change in capacitance due to temperature change ranged from −20% at −25° C., to +10% at +150° C.

Examples 2 and 3

The same procedure was used in Examples 2 and 3, except for the dielectric compositions, which are fully described in Tables I and II. Resultant dielectric constant and dissipation factor are recorded in Table II.

TABLE II.—DIELECTRIC COMPONENTS; PROPERTIES OF CAPACITOR

| Dielectric components | Capacitor property | Example number (weight percent) | | |
|---|---|---|---|---|
|  |  | 1 | 2 | 3 |
| $BaTiO_3/ZrO_2$ [a] |  | 95.02 | 95.5 | 95.02 |
| $Fe_2O_3$ |  | 2.50 | 2.5 | 2.50 |
| Glass [b] |  | 2.48 | 2.5 | 2.48 |
|  | K | 1,450 | 1,400 | 1,400 |
|  | DF (percent) | 2.5 | 2.3 | 2.0 |

[a] Calcined inorganic materials Nos. 1, 2 and 3, respectively, of Table I.
[b] The glass consisted of 82% $Bi_2O_3$, 11% PbO, 3.5% $SiO_2$ and 3.5% $B_2O_3$.

Examples 4–7

Additional examples were run as Example 1, except as indicated below. The metalizing composition used in both the top and bottom electrodes consisted of 27.5% palladium, 50.2% silver, 17.8% bismuth oxide and 4.5% glass. The glass component of the metalizing composition was the same as the glass in the metalizing composition of Example 1.

The dielectric composition for each of these examples is set forth in Table III; the composition of the calcined inorganic material is set forth in Table I.

The bottom electrode was fired at 1000° C. for two minutes. After printing of the dielectric and top electrode as in Example 1, the entire stack was then fired at 1050° C. for five minutes. Resultant dielectric constant and dissipation factor are set forth in Table III.

TABLE III.—DIELECTRIC COMPONENTS; PROPERTIES OF CAPACITOR

| Dielectric components | Capacitor property | Example number (weight percent) | | | |
|---|---|---|---|---|---|
| | | 4 | 5 | 6 | 7 |
| $BaTiO_3$/oxide a | | 95 | 95 | 95 | 95 |
| $Fe_2O_3$ | | 2.5 | 2.5 | 2.5 | 2.5 |
| Glass b | | 2.5 | 2.5 | 2.5 | 2.5 |
| | K | 2,514 | 2,610 | 2,075 | 2,933 |
| | DF (percent) | 3.4 | 3.4 | 3.7 | 3.4 | a Calcined inorganic materials Nos. 4–7 of Table I.
b Same glass as Table II.

In applying the dielectric compositions of this invention, it is sometimes desirable, although not necessary, to disperse the solids in a vehicle. Any inert liquid may be utilized as a vehicle. Water or any one of various organic liquids with or without thickening and/or stabilizing, and/or other common additives may be used. Examples of organic liquids that can be used are the aliphatic alcohols; esters of such alcohols, for example, the acetates and propionates; the terpenes, such as pine oil, alpha- and beta-terpineol and the like; solutions of resin such as polymethacrylates of lower alcohols, or solutions of ethyl cellulose, and solvents such as pine oil and the monobutyl ether of ethylene glycol monoacetate. The vehicle may contain or be composed of volatile liquids to promote fast setting after application; or it may contain waxes, thermoplastic resins or the like materials which are thermofluids so that the vehicle-containing composition may be applied at elevated temperatures to a relatively cold ceramic body upon which the composition sets immediately.

The proportions of inert vehicle to solids may vary considerably depending upon the manner in which the dispersion is to be applied and the kind of vehicle used. Generally, from 30–90% solids are dispersed in from 70–10% by weight of the inert liquid vehicle.

Since it is obvious that many changes and modifications can be made in the above-described details without departing from the nature and spirit of this invention, it is to be understood that the invention is not to be limited to said details except as set forth in the appended claims.

We claim:

1. A powder mixture useful for producing fired dielectric compositions having a dielectric constant of over 1000 and a dissipation factor below 4%, at a firing temperature in the range 750–1150° C., consisting essentially of (A) a calcined inorganic material consisting essentially of 95–99.99 mole percent $BaTiO_3$ and 0.01–5 mole percent of an oxide selected from the group consisting of $ZrO_2$, $Al_2O_3$, $SiO_2$, $N_2O_5$ and mixtures thereof, (B) $Fe_2O_3$ and (C) a substantially nonconductive glass binder consisting essentially of 70–90% $Bi_2O_3$, 5–15% PbO, 2–5% $SiO_2$ and 2–5% $B_2O_3$; wherein said powder mixture, in weight percent, consists essentially of 90–98% of (A) 1–5% (B) and 1–5% (C).

2. A powder mixture in accordance with claim 1 consisting essentially of 92–96% (A), 2–4% (B) and 2–4% (C).

3. A powder mixture in accordance with claim 1 wherein the oxide in component (A) is $ZrO_2$.

4. A powder mixture in accordance with claim 1 wherein components (A) and (B) consist essentially of particles of a size within the range of 0.5–5 microns.

5. A powder mixture in accordance with claim 1 wherein the oxide in component (A) is $Al_2O_3$.

6. A powder mixture in accordance with claim 1 wherein the oxide in component (A) is $SiO_2$.

7. A powder mixture in accordance with claim 1 wherein the oxide in component (A) is $Nb_2O_5$.

8. A powder mixture in accordance with claim 3 wherein components (A) and (B) consist essentially of particles of a size within the range of 0.5–5 microns.

9. A dielectric ceramic body having a dielectric constant over 1000 and a dissipation factor less than 4% consisting essentially of the powder mixture of claim 1 fired at a temperature in the range 750–1150° C.

10. A dielectric ceramic body having a dielectric constant over 1000 and a dissipation factor less than 4% consisting essentially of the powder mixture of claim 2 fired at a temperature in the range 750–1150° C.

11. A powder mixture useful for producing fired dielectric compositions having a dielectric constant of over 1000 and a dissipation factor below 4%, at a firing temperature in the range 750–1150° C., consisting essentially of (A) a calcined inorganic material consisting essentially of 95–99.99 mole percent $BaTiO_3$ and 0.01–5 mole percent of an oxide selected from the group consisting of $ZrO_2$, $Al_2O_3$, $SiO_2$, $Nb_2O_5$ and mixtures thereof, (B) $Fe_2O_3$ and (C) a substantially nonconductive glass binder consisting essentially of 70–90% $Bi_2O_3$, 5–15% PbO, 2–5% $SiO_2$ and 2–5% $B_2O_3$ wherein said powder mixture, in weight percent, consists essentially of 90–98.5% (A), 0.5–5% (B) and 1–5% (C).

12. A powder mixture in accordance with claim 5 wherein components (A) and (B) consist essentially of particles of a size within the range of 0.5–5 microns.

13. A powder mixture in accordance with claim 6 wherein components (A) and (B) consist essentially of particles of a size within the range of 0.5–5 microns.

14. A powder mixture in accordance with claim 7 wherein components (A) and (B) consist essentially of particles of a size within the range of 0.5–5 microns.

References Cited

UNITED STATES PATENTS

| | | | |
|---|---|---|---|
| 2,836,501 | 5/1958 | Crownover | 106—39 R |
| 3,373,120 | 3/1968 | Nitta et al. | 252—520 |
| 3,385,799 | 5/1968 | Hoffman | 252—514 |
| 3,437,892 | 4/1969 | Hoffman | 317—258 |
| 3,480,566 | 11/1969 | Hoffman | 252—514 |
| 2,695,240 | 11/1954 | Oshry | 106—39 R |
| 2,803,553 | 8/1957 | Oshry | 106—39 R |
| 2,975,145 | 3/1961 | Harris | 252—520 X |

OTHER REFERENCES

Baxter, P. et al.: Effect of Additives of Limited Solid Solubility on Ferroelectric Properties of Barium Titanate Ceramics in J. Amer. Cer. Soc., 42, pp. 465–70.

Babcock, G. et al.: Effect of Iron Oxide on Properties of Soda-Dolomite Lione-Silica Glass; in J. Amer. Cer. Soc., 25 (1942), pp. 401–8.

TOBIAS E. LEVOW, Primary Examiner

W. R. SATTERFIELD, Assistant Examiner

U.S. Cl. X.R.

252—62.3 BT, 519, 520; 317—258